INVENTORS
Bernhard Kalkner &
Hans Becker

BY Spencer & Kaye

ATTORNEYS

United States Patent Office 3,461,308
Patented Aug. 12, 1969

3,461,308
CIRCUIT ARRANGEMENT FOR LIMITING OVERLOAD CURRENTS INCORPORATING A CAPACITOR AND AN INDUCTANCE AND MEANS FOR MAKING THE CAPACITOR FUNCTION AS A NON-LINEAR CURRENT-DEPENDENT ELEMENT
Bernhard Kalkner, Bad Homburg vor der Hohe, and Hans Becker, Darmstadt, Germany, assignors to Licentia Patent-Verwaltungs-G.m.b.H., Frankfurt am Main, Germany
Filed Feb. 8, 1966, Ser. No. 525,919
Claims priority, application Germany, Feb. 8, 1965,
L 49,915
Int. Cl. H02j 3/38
U.S. Cl. 307—51
4 Claims

ABSTRACT OF THE DISCLOSURE

A circuit arrangement for limiting overload currents, particularly for use at the juncture of two alternating current nets, as well as for limiting balancing currents between the nets in the case of a short circuit in one of the nets or in case the nets fall out of synchronism. The circuit arrangement comprises a capacitor and an inductance forming a series-circuit whose resonant frequency is tuned at least approximately to the net frequency, there being connected in parallel with the capacitor a shunt circuit which makes the capacitor function as a non-linear current-dependent element. The shunt circuit incorporates a series-circuit of an ohmic resistor and a saturable choke, the ratio of the reactance of the choke, when the same is in saturated condition, to the reactance of the capacitor being between 0.1 and 1 and the ratio of the resistance of the ohmic resistor to the reactance of the capacitor being between 0.3 and 2.

---

The present invention relates to an electric circuit arrangement for limiting current overloads, particularly excess currents which occur when large electric power systems are coupled to each other.

When massive current systems are coupled to each other, difficulties which arise due to the short-circuit currents which may flow in the case of faults are far greater than those which can be expected in the individual systems. For one thing, the switches and circuit breakers, while capable of handling any excess currents that may arise within any one system, will be overloaded; as a result, the circuit breakers will either be incapable of interrupting the circuit at all, or they will interrupt the circuit only after the short-circuit current has gone through a relatively large number of half-cycles. Also, the various components of the systems will be severely overloaded due to the dynamic forces of the unexpectedly high short-circuit currents. This may damage transformers, rupture conductors and in general cause the switching installations to break down.

The fact that not only the thermal effects of the short-circuit currents will produce damage but that also the dynamic forces will damage the electrical equipment, makes it necessary to consider the concept of how to protect the system in a new light. Thus, a critical examination of the problem shows that it will not do simply to equip the system with an additional switch having the requisite high current handling capacity, because this will only partially protect the more vulnerable net, the switch itself being unable to completely protect the net from the dynamic effects. The net itself can be properly protected only if the current is limited at once, i.e., already during the first half-wave of the overload current. Only then will the inherently vulnerable net be properly protected from the dynamic effects, so that the switching equipment in the net will not be subjected to any overload currents which it can not handle. As a result, the switching equipment in the net will be able to carry out its assigned function within the normal period. Consequently, the short-circuit current can be interrupted within the permissible interval. This, in turn, means that the other nets and power stations connected to the net in which the fault has occurred will not be able to feed short-circuit currents to the faulted net, so that after the local short circuit has been isolated, the other nets can continue their normal operation. Thus, if the current can be limited during the very time of the fault, normal operation can be resumed all the quicker, and the various nets will not so easily fall out of synchronism as they would but for this current limiting.

It is, therefore, the primary object of the present invention to provide a way in which to prevent the damages resulting from overload currents occurring in a system of coupled together current nets, and consequently to achieve the above-described sought-after advantages. Accordingly, the present invention resides, basically, in a circuit arrangement for limiting overload currents, particularly for use at the juncture of two alternating current nets, as well as for limiting balancing currents between the nets in the case of a short-circuit in one of the nets or in case the nets fall out of synchronism, there being in the connection a series-circuit consisting of a capacitor and an inductance, the resonant frequency of this series-resonant circuit being tuned at least approximately to the net frequency. According to the present invention, the capacitative component is made to function as a non-linear current-dependent element, this being accomplished as follows: connected in parallel with the capacitor is a shunt circuit consisting of a series-circuit of an ohmic resistor and a closed core type saturable choke, the ratio of the reactance of the saturable choke in the shunt circuit, in saturated condition, to the reactance of the capacitor being between 0.1 and 1 and the ratio of the resistance of the ohmic resistor in the shunt circuit to the reactance of the capacitor being between 0.3 and 2.

According to a further feature of the present invention, the voltage at which the choke becomes saturated is less than the peak value of the line voltage, e.g., half the line voltage.

Additional objects and advantages of the present invention will become apparent upon consideration of the following description when taken in conjunction with the accompanying drawings in which.

Figure 1:
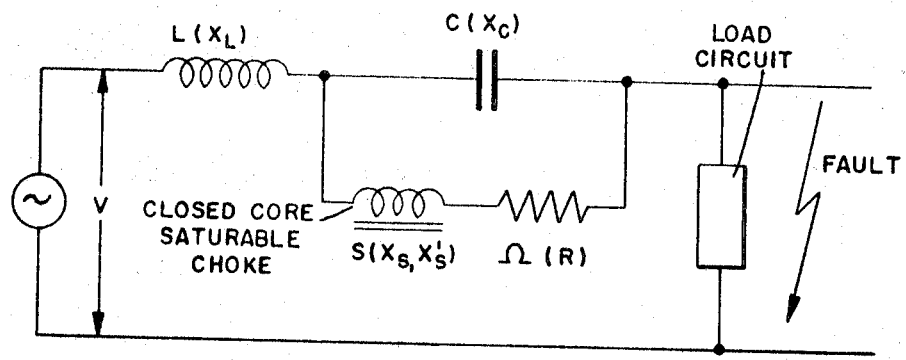
FIGURE 1 is a circuit diagram of a current-limiting circuit arrangement according to the present invention.

Referring now to the drawing, FIGURE 1 thereof shows a current-limiting circuit arrangement according to the present invention, the same being connected between a voltage source which puts out an alternating driving voltage V and a load circuit, the flash across the load circuit representing a short-circuit fault in the load circuit. The series-resonant circuit in the line connecting the voltage source and the load circuit comprises a linear inductance L having, at the line frequency, an inductive reactance $X_L$, and a capacitor C having, at the line frequency, a capacitative reactance $X_C$. Connected in parallel with the capacitor C is a shunt circuit consisting of an ohmic resistor Ω, having a resistance R, and a saturable choke S in the form of a closed iron core type inductance coil S having a reactance $X_S$ in unsaturated condition and a reactance $X_S'$ in saturated condition.

Figure 2:
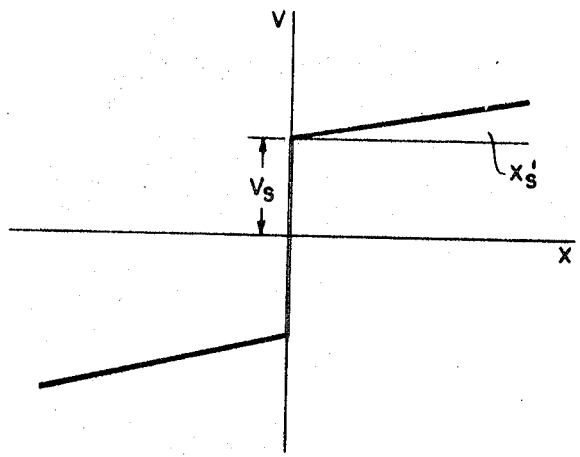
FIGURE 2 is a simplified reactance characteristic of the saturable choke.

FIGURE 2 shows the characteristic of the choke S, in simplified form. In practice, the voltage $V_S$ at which the choke comes into the saturated range is half the line voltage V; maximally, $V_S$ should be below the peak value of V.

According to the present invention, the ratio of the reactance of the saturable choke S, in saturated condition, to the reactance of the capacitor C is between 0.1 and 1 and the ratio of the resistance of the ohmic resistor $\Omega$ to the reactance of the capacitor C is between 0.3 and 2. This is expressed mathematically as follows:

$$0.1 \leq \frac{X_S'}{X_C} \leq 1 \quad (1)$$

$$0.3 \leq \frac{R}{X_C} \leq 2 \quad (2)$$

By selecting the circuit parameters to satisfy the above criteria, the two nets which are connected to each other—these being, in the illustrated circuit, the voltage source and the load circuit—will operate properly in parallel and the formation of an excessively large first and second half-wave is effectively prevented.

It will thus be seen that, in accordance with the present invention, there is provided a series-circuit incorporating two reactances of opposite algebraic sign, i.e., the inductive reactance $X_L$ and the capacitative reactance $X_C$, which, to form a resonant circuit, are about equal to each other at the line frequency, the capacitative reactance being provided with means which render it dependent on current such that above a given threshold current, the resulting total reactance is significantly changed thereby to limit the current which can flow through the series-circuit.

The above result could be achieved, for example, by connecting the capacitor to the series-circuit by way of a transformer which, upon saturation of its iron core, limits the voltage and hence the capacitor current. However, the abrupt change-over from capacitative to inductive operation, which occurs in the case of overload when the capacitor and the inductance of the transformer are connected in parallel with each other, is something which is best avoided, since a fault may occur in but one phase of a polyphase system. The system may, however, be kept from falling out of synchronism by connecting the capacitor, if not directly, then by means of a non-saturable transformer, and providing the saturable choke in the shunt path which is connected in parallel with the capacitor.

The reactance of the choke coil S, in non-saturated condition, will be sufficiently high in the normal current range so as not to disturbe the resonance established by the capacitor C and the main reactance L. However, when, due to increased current, the voltage drop across the capacitor reaches a given threshold value, the core of the choke becomes saturated and the inductance thereof is reduced. The impedance in the shunt circuit thereupon becomes predominantly ohmic, and this disturbes the resonance of the LC circuit and the impedance of this series-circuit is greatly increased, so that current flow in the line joining the two nets will be effectively limited. In practice, the limit current, that is to say, the maximum of the quiescent or steady-state short-circuit current, can be kept down to a value which is close to the rated current.

If the circuit parameters are selected with an eye to keeping the limit current as close to the rated current as possible, this will, theoretically, produce optimum results. However, the following two factors should be borne in mind:

Firstly, consider the transients: the amplitude of the current at the instant at which the current occurred and its phase relationship to the voltage are most important insofar as the first half-wave is concerned. Superimposing the current which is already flowing with the first half-waves of the transient current, may already produce a voltage across the main inductance and the capacitor which, for practical purposes, is determinative for the design of the circuit and which may already be about twice as large as the voltage at rated current.

Secondly, the very reason for coupling two nets to each other is to let one net help the other in the case of a fault. Consequently, to bring the limit current down to the rated current would defeat the basic purpose of coupling the nets to each other in that the unfaulted net would no longer automatically assist the faulted net, and the two nets would be more likely to fall out of synchronism.

Therefore, the circuit parameters are, in accordance with the present invention, so selected that the steady-state short-circuit current which the coupling circuit will allow to flow is fixed at between 1.5 and 2 times the value of the rated current. As a result, in the case of a fault in one net, the other net will absorb part of the overload current pulse. Furthermore, a sufficiently high synchronizing moment will be available from the electrical side, so that premature falling out of synchronism of the nets will be avoided.

The condition described in conjunction with the first-mentioned factor is also improved by selecting circuit parameters which fix the limit current at between 1.5 and 2 times the rated current. For one thing, there will now be sufficient time for the short-circuit current which is starting to build up to reach a value which is ultimately fixed by the saturation induction of the saturable choke. Another advantageous result which is achieved is that the amplitude and phase position of the current, at the instant at which the short circuit occurs, will no longer have such a marked effect on the maximum value of the first half-waves. It can be shown experimentally as well as mathematically that when the short circuit occurs, the first half-waves will not be significantly greater than the final steady-state short-circuit current.

It is for the above reasons that the capacitor C, the choke S and resistance $\Omega$ are selected such that $X_C$, $X_S'$ and R meet the criteria defined in (1) and (2), set forth above.

In practice, the choke S which is used in the circuit will be a choke which goes from unsaturated to saturated condition at a voltage which is less than the peak value of the line voltage, preferably a voltage which is equal to half the line voltage.

It will be understood that the above description of the present invention is susceptible to varius modifications, changes, and adaptations, and the same are intended to be comprehended within the meaning and range of equivalents of the appended claims.

The following are illustrative and not limitative examples of a circuit according to the present invention.

Example I

Two nets, operating at a line voltage $V_{line}$ of 10,000 volts and a line frequency $f_{line}$ of 50 cycles per second, and having current ratings $I_r$ of about 150 a. were joined to each other. During normal, no-fault operation, $X_L \approx X_C \approx 44$ ohms, $X_S$ being about 12,000 ohms, and R being about 30 ohms. Upon the occurrence of a fault, the choke S assumes its saturated condition where $X_S' \approx 30$ ohms, so that $X_S'/X_C \approx 0.682$ and $R/X_C \approx 0.682$ and $V_S \approx 6,200$ v.

| Example | II | III | IV |
| --- | --- | --- | --- |
| $V_{line}$, v | 127,000 | 220,000 | 220,000 |
| $f_{line}$, c./s | 50 | 50 | 50 |
| $I_r$, a | 3,000 | 1,730 | 1,730 |
| $X_L$, $\Omega$ | 9.4 | 127 | 127 |
| $X_C$, $\Omega$ | 9.4 | 127 | 127 |
| $X_S$, $\Omega$ | 1,540 | | |
| $X_S'$, $\Omega$ | 3.76 | 12.7 | 127 |
| R, $\Omega$ | 3.3 | 70 | 102 |
| $X_S'/X_C$ | 0.4 | 0.1 | 7.0 |
| $R/X_C$ | 0.35 | 0.55 | 0.8 |
| $V_S$, v | 28,200 | 220,000 | 220,000 |

What is claimed is:

1. A circuit arrangement for limiting overload currents, particularly for use at the juncture of two alternating current nets, as well as for limiting balancing currents between the nets in the case of a short circuit in one of the nets or in case the nets fall out of synchronism, said circuit arrangement comprising, in combination:
   (a) a capacitor and an inductance forming a series-circuit whose resonant frequency is tuned at least approximately to the net frequency; and
   (b) means connected across said capacitor for making the same function as a non-linear current-dependent element, said means including a shunt circuit connected in parallel with said capacitor and incorporating a series-circuit of an ohmic resistor and a saturable choke, the ratio of the reactance of said choke, in saturated condition, to the reactance of said capacitor being between 0.1 and 1 and the ratio of the resistance of said ohmic resistor to said reactance of said capacitor being between 0.3 and 2.

2. A circuit arrangement as defined in claim 1 wherein said saturable choke is a closed core type choke.

3. A circuit arrangement as defined in claim 1 wherein said choke is a choke which goes from unsaturated to saturated condition at a voltage which is less than the peak value of the line voltage.

4. A circuit arrangement as defined in claim 1 wherein said choke is a choke which goes from unsaturated to saturated condition at a voltage which is equal to half the line voltage.

References Cited

UNITED STATES PATENTS 2,989,545  8/1959  Bird _____ 323—77

FOREIGN PATENTS 1,149,801  6/1963  Germany.

ROBERT K. SCHAEFER, Primary Examiner

H. J. HOHAUSER, Assistant Examiner

U.S. Cl. X.R.

317—49, 61, 256; 323—77